United States Patent [19]

Heinz

[11] 3,735,145

[45] May 22, 1973

[54] MAGNETIC BUBBLE DOMAIN SYSTEM

[75] Inventor: David M. Heinz, Orange, Calif.

[73] Assignee: North American Rockwell Corporation, El Segundo, Calif.

[22] Filed: Oct. 16, 1970

[21] Appl. No.: 81,232

[52] U.S. Cl......307/88 LC, 340/174 TF, 340/174 SR

[51] Int. Cl. .H03k 19/168, G11c 11/14, G11c 19/00

[58] Field of Search..................340/174 MC, 174 FB, 340/174 TF; 307/88 LC

[56] References Cited

UNITED STATES PATENTS

| | | | |
|---|---|---|---|
| 3,636,531 | 1/1972 | Copeland | 340/174 TF |
| 3,523,286 | 8/1970 | Bobeck et al. | 340/174 TF |
| 3,540,019 | 11/1970 | Bobeck et al. | 340/174 TF |
| 3,553,661 | 1/1971 | Hadden, Jr. | 340/174 FB |
| 3,460,116 | 8/1969 | Bobeck et al | 340/174 MC |
| 3,438,006 | 4/1969 | Spain | 340/174 MC |
| 3,503,054 | 3/1970 | Bobeck et al | 340/174 MC |

*Primary Examiner*—Stanley M. Urynowicz, Jr.
*Attorney*—L. Lee Humphries, H. Fredrick Hamann and Joseph E. Kieninger

[57] ABSTRACT

A magnetic bubble domain system comprising one or more channels of magnetic bubble domain material on a supporting substrate is described. Any number of these individual magnetic bubble domain channels may be interconnected or connected to a main channel. The movement of bubble domains along a channel is effected by the repulsive or interaction forces between bubble domains which are present in a channel when a bubble domain is formed or propagated near another bubble domain. The movement of bubbles from a given channel into one of several possible adjoining channels to perform a logic function may be directed by the presence or absence of bubbles in one or more connecting channels.

8 Claims, 4 Drawing Figures

INVENTOR.
DAVID M. HEINZ

BY *Joseph E. Kieninger*

ATTORNEY

INVENTOR.
DAVID M. HEINZ
BY Joseph E. Kieninger
ATTORNEY

MAGNETIC BUBBLE DOMAIN SYSTEM

BACKGROUND OF THE INVENTION

1. Field of the Invention

This invention relates to magnetic bubble domain and more particularly to a system for the manipulation of magnetic bubble domains.

2. Description of Prior Art

Magnetic domains and the propagation thereof in a magnetic medium are well known in the art and are described in U.S. Pat. Nos. 3,460,116; 3,470,546; 3,508,225; and others. In general, these patents describe the movement of single wall bubble domains in a shift register by the use of narrow metal patterns to control the positions of the bubbles. The methods described in these patents attempt to minimize the repulsive or interaction forces between the individual bubbles by separating the individual bubbles from each other by a distance which is about three or more bubble domain diameters. These methods try to substantially eliminate or minimize as much as possible the interaction force between bubbles.

SUMMARY OF THE INVENTION

It is an object of this invention to provide an improved method for magnetic bubble domain manipulation.

It is another object of this invention to avoid the total reliance on metal patterns in controlling the position and movement of the bubble domains.

It is yet another object of this invention to manipulate magnetic bubble domains by the repulsive or interaction forces existing between bubble domains to carry out logic functions.

It is still another object of this invention to increase the density of bubble domains which may be accommodated in a given area.

These and other objects of this invention are realized by a magnetic bubble domain system in which a plurality of channels made of bubble domain material are interconnected on a supporting substrate. These channels may be conveniently formed by etching through a thin film of magnetic domain material to the surface of the supporting substrate. The movements of bubble domains in a channel are effected by the repulsive forces between bubble domains which occur when a bubble domain is propagated. For example, the propagation or formation of an individual bubble domain at the entrance to a channel will cause an adjacent bubble domain to be repelled which causes that adjacent bubble domain to move away from the bubble domain that was just introduced. This movement by the adjacent bubble domain in turn repulses a third bubble domain which in turn repulses and causes a fourth bubble domain to move, and so forth. The bubble domains advance along a channel in single file since they are constrained by the channel surfaces. The channels of bubble domain material may be connected so that the movement of bubble domains in one channel will influence and cause a movement of bubbles in a second channel to flow in a given direction. The geometry of the channel arrangement permits the movement of bubble domains to be controlled so as to perform logic and control functions.

These and other objects of this invention will be more readily understood from a consideration of the following detailed description:

DETAILED DESCRIPTION

Figure 1:
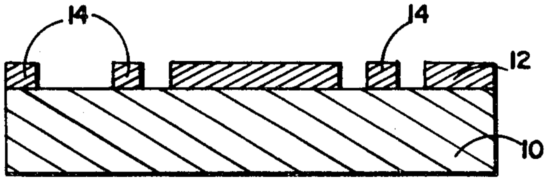
FIG. 1 shows a cross sectional view of a bubble domain system.

In accordance with this invention, as shown in FIG. 1, a monocrystalline substrate 10 is subjected to a chemical vapor deposition step to provide a thin film of magnetic bubble domain material film 12. The deposition step is carried out in accordance with the copending application, Ser. No. 16,446, filed Mar. 4, 1970, and Ser. No. 989, filed Jan. 6, 1970, assigned to the assignee of the present invention. These pending patent applications are incorporated herewith by reference thereto. While the preferred method involves the use of chemical vapor deposition to form the film 12, it is understood that the film 12 may be formed by other means and then positioned on the substrate.

The substrate 10 is a monocrystalline material having a JQ-oxide formulation wherein the J constituent of the wafer formulation is at least one element selected from the group consisting of cerium, praseodymium, neodymium, promethium, samarium, europium, gadolinium, terbium, dysprosium, holmium, erbium, thulium, ytterbium, lutetium, lanthanum, yttrium, magnesium, calcium, strontium, barium, lead, cadium, lithium, sodium and potassium; and the Q constituent of the wafer formulation is at least one element selected from the group consisting of indium, gallium, scandium, titanium, vanadium, chromium, maganese, rhodium, zirconium, hafnium, molybdenum, tungsten, niobium, tantalum, and aluminum.

The valence of the J constituent and the valence of the Q constituent add up to the same valence total as the oxide constituent. Examples of substrate materials are $YAlO_3$, $CaTiO_3$, $Gd_3Ga_5O_{12}$, and $Y_3Al_5O_{12}$.

The film of bubble domain material is a film having a JQ-oxide formulation wherein the J constituent of the film formulation has at least one element selected from the group of cerium, praseodymium, neodymium, promethium, samarium, europium, gadolinium, terbium, dysprosium, holmium, erbium, thulium, ytterbium, lutetium, lanthanum and yttrium; the Q constituent of the film formulation is taken from the group consisting of iron, iron and aluminum, iron and gallium, iron and indium, iron and scandium, iron and titanium, iron and vanadium, iron and chromium, and iron and maganese.

The valence of the J constituent and the valence of the Q constituent add up to the same valence total as the oxide constituent. The preferred materials are garnets and orthoferrites, examples of these compounds are $GdFeO_3$, $YFeO_3$, and $Y_3Fe_{3.8}Ga_{1.2}O_{12}$.

Magnetic bubble domain material film 12 is etched with an etchant by applying standard photolithographic techniques of the type commonly used in semiconductor industry to form the channels 14. Any number of channels may be formed to provide the desired channel pattern.

While the preferred method is to deposit a film of magnetic bubble domain material on the substrate and etch the film to form the channel, other methods may be used. One such method involves providing a mask on the substrate and depositing the magnetic bubble domain material directly into the channel pattern formed by the mask.

Figure 2A:
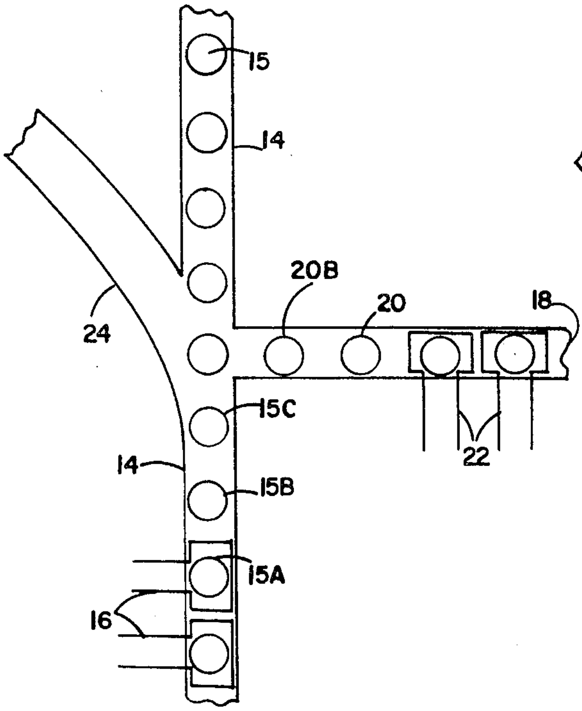
FIGS. 2*a* and 2*b* shows a top view of a bubble domain channel arrangement.
Figure 2B:
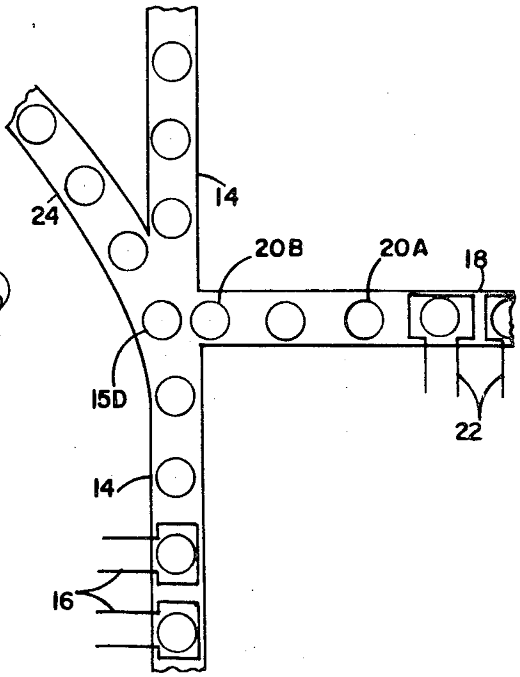

An example of a specific channel configuration and how it functions is shown in FIGS. 2*a* and 2*b*. In FIG. 2*a*, channel 14 is filled with magnetic domain bubbles 15 which have been propagated by a conventional propagation source means 16. The propagation source 16 fills the channel 14 with magnetic bubble domains 15. The magnetic bubble domains 15 are spaced at an equilibrium distance from each other. As a new bubble domain 15A is introduced by means 16, the adjacent bubble domain 15B is repelled therefrom and moves away from the propagation source 16. Bubble domain 15B in turn repels the adjacent bubble domain 15C which repels bubble domain 15D and so on down channel 14. A continuation of inter bubble forces tends to have the nominal effect of moving the bubble domains along channel 14.

Another channel 18 is connected to channel 14 within channel 14, that is at a point where bubble domains 15 in channel 14 can propagate through the intersection of channels 14 and 18 without leaving channel 14. Channel 18 is filled with the magnetic bubble domains 20. A propagation source means 22 is shown which is able to introduce additional bubble domains 20. As explained above bubble domains 20 are propagated by their mutual repulsion force, which may be the sole propagation mechanism. As shown in FIG. 2*a*, the system is in equilibrium and the bubble domains pass directly through channel 14 and do not pass into channel 24.

However, as shown in FIG. 2*b*, if propagation source 22 is activated to introduce another bubble domain 20A, the bubble domains in turn repel each other and a bubble domain 20B is partially forced into the channel 14. As additional bubble domains 15 were added by source 16, they are repelled by domain 20B, thereby forcing or diverting the bubble domains 15D from channel 14 into channel 24. The channel assembly, therefore, functions as a monostable logic device with source 22 as the control. As long as bubble domain 20B is partially in channel 14, bubble domains 15D will be diverted into channel 24. When propagating source 22 no longer forces bubbles 20 into channel 14, bubbles 15 will proceed along channel 14.

Figure 3:
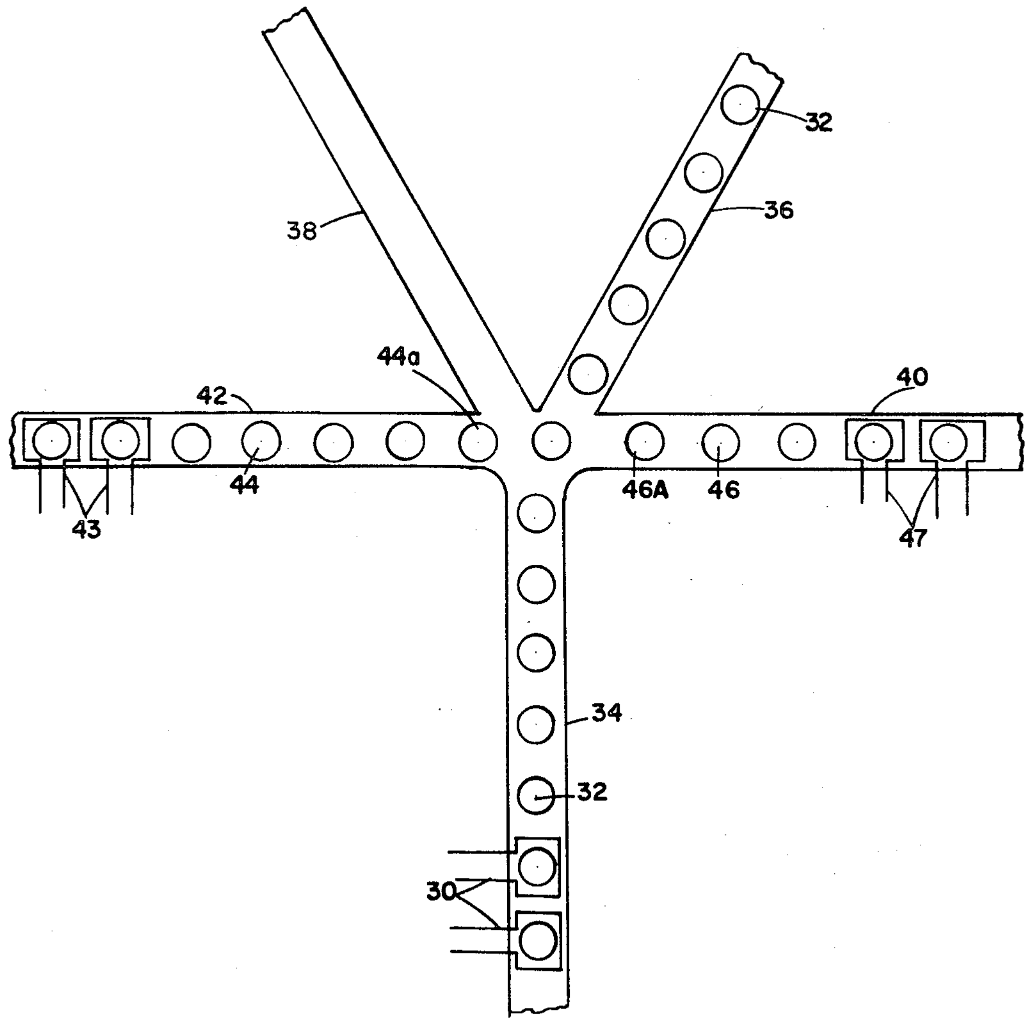
FIG. 3 is a top view of a second bubble domain channel arrangement.

Another channel geometry, as shown in FIG. 3, performs a flip-flop function. In FIG. 3, a propagation source 30 introduces bubble domains 32 in channel 34. As more bubbles are propagated, the bubbles tend to go down the channel 34 into either channel 36 or channel 38. The control of movement of bubble domains from channel 34 into channel 36 or channel 38 is determined by the repulsive forces of bubble domains in channels 40 and 42. By propagating from control source 43, a sufficient number of bubble domains 44 in channel 42 to introduce bubble 44A partially into the intersection of the five channels, bubble 44A repels bubbles 32 in channel 34 into channel 36.

Similarly, by deactivating control source 43 and activating control source 47, a bubble domain 46A in channel 40 may partially enter the intersection of the five channels, repelling the bubble domains 32 in channel 34 into channel 38. Many other channel geometries may be used to form additional logic and control functions utilizing magnetic bubble domains. The control of logic devices may employ switchable hard magnetic materials rather than control channels.

Although several preferred embodiments of this invention have been described, it is understood that numerous other arrangements may be made in accordance with the principles of this invention.

I claim:

1. A magnetic bubble domain system comprising
a substrate
a thin film of magnetic bubble domain material on said substrate; and
at least one channel in said film defined by at least one groove extending through said film to the surface of said substrate, the sole bubble domain propagation mechanism within one of said channels being the mutual repulsion forces between the bubble domains introduced therein, whereby the introduction of a new bubble domain into the one channel repels those already in the channel so that preexisting bubbles propagate a distance equal to the equilibrium separation between adjacent bubble domains which is determined by their mutual repulsion forces.

2. A magnetic bubble domain system as decribed in claim 1 wherein said channel is defined by two grooves.

3. A magnetic bubble domain system as described in claim 1 wherein said bubble domain material has a JQ-oxide formulation wherein:
the J constituent of said bubble domain material formulation has at least one element selected from the group consisting of cerium, praseodymium, neodymium, promethium, samarium, europium, gadolinium, terbium, dysprosium, holmium, erbium, thulium, ytterbium, lutetium, lanthanum and yttrium, and
the Q constituent of the film formulation is taken from the group consisting of iron, iron and aluminum, iron and gallium, iron and indium, iron and scandium, iron and titanium, iron and vanadium, iron and chromium, and iron and manganese.

4. A magnetic bubble domain system comprising
a substrate,
a thin film of magnetic bubble domain material on said substrate,
a first channel in said film defined by at least one groove extending through said film to the surface of said substrate,
a second channel in said film defined by at least one groove extending through said film to the surface of said substrate connected to said first channel, and
magnetic switching devices associated with said first channel adapted to divert the movement of a bubble domain in said first channel to movement of a bubble domain in said second channel.

5. A magnetic bubble domain system comprising
a substrate
a thin film of magnetic bubble domain material on said substrate,
a first channel in said film defined by at least one groove extending through said film to the surface of said substrate, and
a second channel in said film defined by at least one groove extending through said film to the surface of said substrate connected to said first channel within the first channel, said second channel being positioned so that the movement of a bubble domain in the first channel will be affected by a bubble domain within the second channel positioned so that it partially extends into the intersection of the first and second channels.

6. A magnetic bubble domain system comprising
a substrate
a thin film of magnetic bubble domain material on said substrate;
a first channel in said film defined by at least one groove extending through said film to the surface of said substrate;
a second channel in said film connected to said first channel and defined by at least one groove extending through said film to the surface of said substrate; and
a third channel in said film connected to said first channel and defined by at least one groove extending through said film to the surface of said substrate wherein the direction of the movement of bubble domains in said first channel will be affected by the position of bubble domains in said second channel and in said third channel.

7. A magnetic bubble domain system comprising
a substrate
a thin film of magnetic bubble domain material on said substrate;
a first channel in said film defined by at least one groove extending through said film to the surface of said substrate; and
a plurality of channels connected to said first channel whereby the position of bubble domains in one of said plurality of channels will affect the direction of movement of a bubble domain when it leaves said first channel.

8. A magnetic bubble domain system comprising
a substrate
a thin film of magnetic bubble domain material on said substrate,
a first channel in said film defined by at least one groove extending through said film to the surface of said substrate,
a second channel in said film defined by at least one groove extending through said film to the surface of said substrate connected to said first channel, and
means associated with the intersection of the first and second channels for controlling the diversion of bubble domains from the first channel into the second channel, said means comprising a third bubble domain channel, whereby the presence in the third channel of a bubble domain extending into the intersection of the channels will divert bubble domains from the first channel into the second channel.

* * * * *